(12) United States Patent
Yamamoto

(10) Patent No.: US 7,224,408 B2
(45) Date of Patent: May 29, 2007

(54) TELEVISION TUNER IN WHICH THE NUMBER OF INTEGRATED CIRCUITS CAN BE REDUCED

(75) Inventor: Masaki Yamamoto, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 473 days.

(21) Appl. No.: 10/924,231

(22) Filed: Aug. 23, 2004

(65) Prior Publication Data

US 2005/0057697 A1 Mar. 17, 2005

(30) Foreign Application Priority Data

Aug. 25, 2003 (JP) ............... 2003-270728

(51) Int. Cl.
*H04N 5/50* (2006.01)
(52) U.S. Cl. ..................... 348/731; 348/733
(58) Field of Classification Search ........ 348/731–733, 348/725; 455/182.3, 190.1, 192.3, 188.1; 334/18, 30, 41, 45–48, 59, 60; *H04N 5/50*
See application file for complete search history.

(56) References Cited

U.S. PATENT DOCUMENTS 6,016,170 A * 1/2000 Takayama et al. .......... 348/731

6,876,401 B2 * 4/2005 Yamamoto .................. 348/729
7,123,309 B2 * 10/2006 Yoda ........................ 348/731

FOREIGN PATENT DOCUMENTS

JP 2003-153107 5/2003

* cited by examiner

*Primary Examiner*—Sherrie Hsia
(74) *Attorney, Agent, or Firm*—Brinks Hofer Gilson & Lione

(57) ABSTRACT

A television tuner contains a mixer 4 for converting a television signal into an intermediate frequency signal and outputting it, an intermediate frequency tuning circuit 5 for tuning the intermediate frequency signal, an intermediate frequency amplifier 7 provided in an integrated circuit 10 and connected to the intermediate frequency tuning circuit 5, and option circuits 2 and 3 provided at the side of the front stage of the mixer 4 for being switched into the operational state or non-operational state at a specific receiving band or channel. The integrated circuit 10 is provided with input terminals 10a and 10b for inputting the intermediate frequency signal output from the intermediate frequency tuning circuit 5 to the intermediate frequency amplifier 7 and a switch control circuit 9 for switching the operation of the option circuits 2 and 3, where the switch voltage output from the switch control circuit 9 is supplied to the option circuits 2 and 3 through the input terminals 10a and 10b.

3 Claims, 1 Drawing Sheet

TELEVISION TUNER IN WHICH THE NUMBER OF INTEGRATED CIRCUITS CAN BE REDUCED

This application claims the benefit of priority to Japanese Patent Application No. 2003-270728. herein incorporated by reference.

BACKGROUND OF THE INVENTION

1. Field of the Invention

The present invention relates to a television tuner, and, more particularly, to a television tuner in which the operation switching of the attached option circuit is simple.

2. Description of the Related Art

FIG. 2 shows the primary portion of a conventional television tuner. A mixer 42 and an intermediate frequency amplifier 43 are included within an integrated circuit 41. The mixer 42 is composed of a balanced circuit, and the balanced output ports thereof are connected to two output terminals 41a and 41b provided in the integrated circuit 41. Also, a selected television signal and a local oscillating signal are input to the mixer 42 and the intermediate frequency signal is output to the output terminals 41a and 41b. The intermediate frequency amplifier 43 is composed of a balanced circuit, and the balanced input ports thereof are connected to two input terminals 41c and 41d provided in the integrated circuit 41.

An intermediate frequency tuning circuit 44 provided outside of the integrated circuit 41 is composed of a parallel tuning circuit comprised of a capacitive element 44a and serially connected inductance elements 44b and 44c, and is connected between the output terminals 41a and 41b. Also, the power supply voltage Vcc applied to the connection point of the two inductance elements 44b and 44c is fed to the mixer 42. In addition, two parallel resonance circuits 45 and 46 are provided outside of the integrated circuit 41. The first parallel resonance circuit 45 is coupled between the output terminal 41a and the input terminal 41c, and the second parallel resonance circuit 46 is coupled between the output terminal 41b and the input terminal 41d.

In the above-described construction, the intermediate frequency tuning circuit 44 tunes at the intermediate frequency band, the first parallel resonance circuit 45 resonates at a video intermediate frequency of a different channel adjacent to the intermediate frequency band, and the second parallel resonance circuit 46 resonates at an audio intermediate frequency of a different channel adjacent to the intermediate frequency band. Thereby, the interference from the adjacent channel is eliminated (For example, refer to Japanese unexamined Patent Publication No. 2003-153107 (FIG. 3))

In such a television tuner, in addition to the interference from the adjacent channel, an FM trap circuit may be provided in the input portion of the tuner (the front stage of the mixer) so as to attenuate a FM broadcasting band in order to avoid the interference due to, for example, the FM broadcasting signal, or an attenuator may be provided to attenuate the strong electric field television signal in order to prevent the distortion generated due to the strong electric field television signal. However, since it is needed to be switched such that the FM trap circuit or the attenuator is not operated in accordance with the usage purpose, a switch control circuit must be provided in the integrated circuit and the operation of the FM trap circuit or the attenuator must be switched according to the switch voltage output from the switch control circuit.

FIG. 3 shows the construction for switching the operation of an option circuit such as the FM trap circuit or the attenuator. Used for connecting an antenna, terminal 21 is connected in cascade with two option circuits 22 and 23 each having a different function. The first option circuit 22 is, for example, an attenuator of which the attenuated amount can be switched. The first option circuit 22 is switched to attenuate the received signal when the strength of the electric field of the received television signal is large, and is switched not to attenuate the signal when the electric field thereof is small. The second option circuit 23 is, for example, an FM trap circuit. The second option circuit 23 is switched to attenuate the FM broadcasting band by the trap function in case of receiving the television signal of the ground wave, and is switched to invalidate the trap function in the case of receiving the CATV television signal.

An input tuning circuit, a high frequency amplifier, and the interstage tuning circuit (not shown) are connected in cascade between the second option circuit 23 and the balanced mixer 24. The mixer 24 is supplied with a local oscillating signal (L.O) from an oscillator (not shown). The output side of the mixer 24 is connected with an intermediate frequency tuning circuit 25 and an adjacent channel trap circuit 26. The balance type intermediate frequency tuning circuit 25 is composed of a parallel tuning circuit comprised of a capacitive element 25a and two serially connected inductance elements 25b and 25c, which are connected in parallel to the capacitive element 25a, and it tunes at the frequency close to the center of the intermediate frequency band. In addition, the parallel tuning circuit is connected in parallel with a resistor 25d in order to adjust the Q of the tuning adequately.

Further, the power supply voltage Vcc applied to the connection point of the two inductance elements 25b and 25c is supplied to the mixer 24 through the two inductance elements 25b and 25c. The adjacent channel trap circuit 26 is comprised of a parallel resonance circuit formed of an inductance element 26a and a capacitive element 26b, and attenuates the video signal of the intermediate frequency band corresponding to the channel adjacent to the high frequency to eliminate the interference.

The integrated circuit 20 comprises an intermediate frequency amplifier 27, a bias circuit 28 and a switch control circuit 29. The intermediate frequency amplifier 27 is composed of a balanced circuit. In addition, the integrated circuit 20 is provided with parallel input terminals 20a and 20b, a power supply terminal 20c, and two switch terminals 20d and 20e. Also, one end of the intermediate frequency tuning circuit 25 is AC-connected to the input terminal 20a through the adjacent channel trap circuit 26, and the other end thereof is AC-connected to the input terminal 20b. The power supply terminal 20c is supplied with the power supply voltage Vcc.

In the integrated circuit 20, the input port of the intermediate frequency amplifier 27 is connected to the parallel input terminals 20a and 20b. In addition, the bias circuit 28 generates a bias voltage from the power supply voltage Vcc to supply it to the input port of the intermediate frequency amplifier 27. Thereby, the intermediate frequency signal output from the mixer 24 is input from the input terminals 20a and 20b to the intermediate frequency amplifier 27 through the intermediate frequency tuning circuit 25 and the adjacent channel trap circuit 26 and it is amplified therein.

The switch control circuit 29 has two switch transistors 29a and 29b, of which the collector is applied with the power supply voltage Vcc. The emitter of the switch transistor 29a is connected to the switch terminal 20d, and the emitter of the switch transistor 29b is connected to the switch terminal 20e. Moreover, each of the bases is applied with a switch signal (voltage) for turning on/off each of the switch transistors 29a and 29b, thereby the switch voltage is output from each emitter to the switch terminals 20d and 20e.

The switch voltage of the switch terminal 20d is supplied to the second option circuit 23 through two serially connected resistors 30 and 31. The connection point of the two resistors 30 and 31 is high-frequency-grounded by a capacitive element 32. Similarly, the switch voltage of the switch terminal 20e is supplied to the first option circuit 22 through the two resistors 33 and 34. The connection point of the two resistors 33 and 34 is high-frequency-grounded by a capacitive element 35.

In the above-mentioned construction, upon operating the first option circuit 22 to attenuate the television signal, the switch transistor 29b is turned on and the switch voltage output from the emitter thereof is applied to the first option circuit 22. Similarly, upon operating the second option circuit 23 to attenuate the FM broadcasting band, the switch transistor 29a is turned on and the switch voltage output from the emitter thereof is applied to the second option circuit 23. When each of the option circuits 22 and 23 is not operated, the switch transistors 29a and 29b are turned off.

Several switch signals among the switch signals for switching the operation of the option circuit are output from the integrated circuit. Hence, the integrated circuit is provided with a terminal for outputting the switch voltage. Generally, if the number of integrated circuits is increased, the package size becomes increased and the scale of the circuit becomes increased, Hence increasing the manufacturing cost thereof. In addition, the option circuit is not necessarily needed, and is provided based in the type of the receiver used in the television tuner. Thereby, if it is planned to have one common integrated circuit, the integrated circuit corresponding to the option circuit is used even in the case where it is not necessary to include the option circuit, hence further increasing the manufacturing cost thereof.

SUMMARY OF THE INVENTION

An object of the present invention is to provide a television tuner that can decrease the number of integrated circuits to reduce the manufacturing cost thereof and can use a common integrated circuit regardless of the usage of the option circuit.

In order to solve the above-mentioned problems, a television tuner comprises a mixer for converting a received television signal into an intermediate frequency signal and outputting it, an intermediate frequency tuning circuit for tuning the intermediate frequency signal, an intermediate frequency amplifier provided in an integrated circuit and connected to the intermediate frequency tuning circuit, and an option circuit provided at the side of the front stage of the mixer for being switched into the operational state or non-operational state at a specific receiving band or channel. The integrated circuit is provided with an input terminal for inputting to the intermediate frequency amplifier the intermediate frequency signal, which is output from the intermediate frequency tuning circuit, and is also provided with a switch control circuit for switching the operation of the option circuit, where the switch voltage output from the switch control circuit is supplied to the option circuit through the input terminal.

In addition, the intermediate frequency amplifier is AC-connected to the input terminal, the switch control circuit has a switch transistor of which the emitter is grounded and the collector is pulled up to the power supply by a feeding resistor, and the collector of the switch transistor is connected to the input terminal through a resistor for blocking high frequency.

Moreover, the switch voltage is supplied to the option circuit through a resistor of which the one end is connected to the input terminal and the other end thereof is high-frequency-grounded.

In the present invention, the intermediate frequency amplifier provided in the integrated circuit and connected to the intermediate frequency tuning circuit, and the option circuit provided at the side of the front stage of the mixer for being switched into the operational state or non-operational state at a specific receiving band or channel are provided. The integrated circuit is provided with the input terminal for inputting to the intermediate frequency amplifier the intermediate frequency signal, which is output from the intermediate frequency tuning circuit, and is also provided with the switch control circuit for switching the operation of the option circuit, where the switch voltage output from the switch control circuit is supplied to the option circuit through the input terminal, thereby the input terminal is shared by the input of the intermediate frequency signal and the output of the switch voltage. Accordingly, the number of integrated circuits can be reduced and thus the manufacturing cost can be reduced. Also, the common integrated circuit can be used regardless of the usage of the option circuit.

In addition, the intermediate frequency amplifier is AC-connected to the input terminal, the switch control circuit has a switch transistor of which the emitter is grounded and the collector is pulled up to the power supply by a feeding resistor, and the collector of the switch transistor is connected to the input terminal through a resistor for blocking high frequency, thereby the switch voltage can be input to the input terminal in correspondence with the on/off of the switch transistor.

Moreover, the switch voltage is supplied to the option circuit through a resistor of which the one end is connected to the input terminal and the other end is high-frequency-grounded, thereby the resistor can be connected in parallel to the intermediate frequency tuning circuit to damp the Q of the intermediate frequency tuning circuit. Therefore, it is not necessary to connect the intermediate frequency tuning circuit to an exclusive resistor for damping Q.

DESCRIPTION OF THE PREFERRED EMBODIMENT

Figure 1:
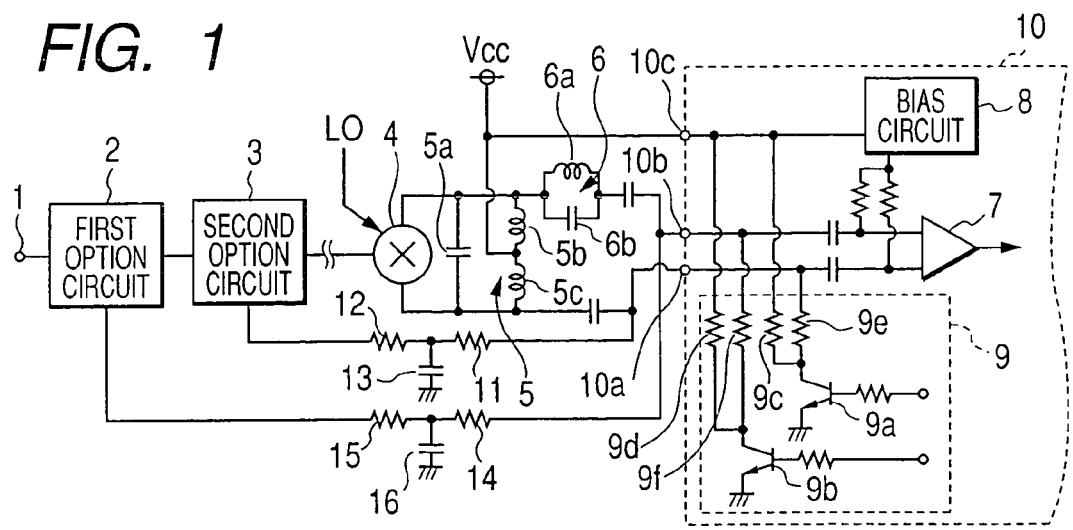
FIG. 1 is a circuit diagram showing the construction of a television tuner according to the present invention.
Figure 2:
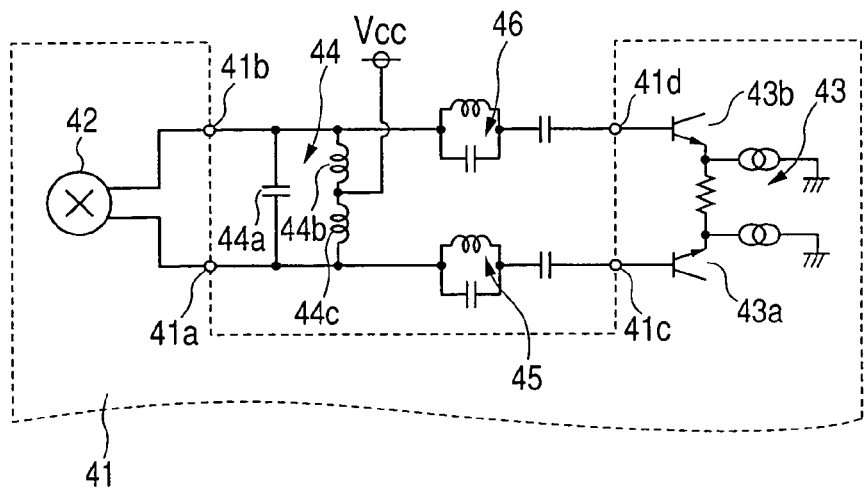
FIG. 2 is a circuit diagram showing the construction of a conventional television tuner.
Figure 3:
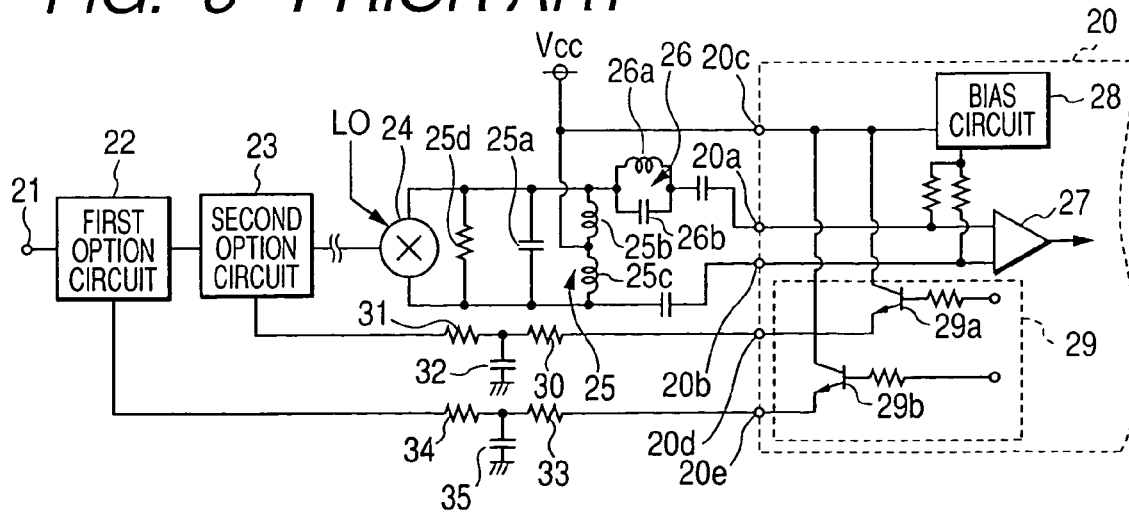
FIG. 3 is a circuit diagram illustrating the problems in the conventional television tuner.

Hereinafter, the television tuner according to the present invention will be described with reference to FIG. 1. An antenna connecting terminal 1 is connected in cascade with two option circuits 2 and 3 each having a different function. The first option circuit 2 is, for example, an attenuator of which the attenuated amount can be switched. The first option circuit 2 is switched to attenuate the received signal when the strength of the electric field of the received television signal is large, and is switched not to attenuate the signal when the electric field thereof is small. The second option circuit 3 is, for example, an FM trap circuit. The second option circuit 3 is switched to attenuate the FM broadcasting band by the trap function in the case of receiving the television signal of the ground wave, and is switched to invalidate the trap function in the case of receiving the CATV television signal.

An input tuning circuit, a high frequency amplifier, and the interstage tuning circuit (not shown) and so on are connected in cascade between the second option circuit 3 and the balanced mixer 4. The mixer 4 is supplied with a local oscillating signal (L.O) from an oscillator (not shown). The output side of the mixer 4 is connected to an intermediate frequency tuning circuit 5 and an adjacent channel trap circuit 6. The balanced intermediate frequency tuning circuit 5 is composed of a parallel tuning circuit comprised of a capacitive element 5a and two serially connected inductance elements 5b and 5c parallel-connected to the capacitive element 5a, and it tunes at the frequency close to the center of the intermediate frequency band.

Further, the power supply voltage Vcc applied to the connection point of the two inductance elements 5b and 5c is supplied to the mixer 4 through two inductance elements 5b and 5c. The adjacent channel trap circuit 6 is comprised of a parallel resonance circuit comprised of an inductance element 6a and a capacitive element 6b, and attenuates the video signal of the intermediate frequency band corresponding to the channel adjacent to the high frequency to eliminate the interference.

Within the integrated circuit 10, an intermediate frequency amplifier 7, a bias circuit 8 and a switch control circuit 9 are provided. The intermediate frequency amplifier 7 is composed of a balanced circuit. In addition, the integrated circuit 10 is provided with parallel input terminals 10a and 10b and a power supply terminal 10c. Also, one end of the intermediate frequency tuning circuit 5 is AC-connected to the input terminal 10a through the adjacent channel trap circuit 6, and the other end thereof is AC-connected to the input terminal 10b. The power supply terminal 10c is supplied with the power supply voltage Vcc.

In the integrated circuit 10, the input port of the intermediate frequency amplifier 7 is AC-connected to the parallel input terminals 10a and 10b. In addition, the bias circuit 8 generates a bias voltage from the power supply voltage Vcc to supply it to the input port of the intermediate frequency amplifier 7. Thereby, the intermediate frequency signal output from the mixer 4 is input from the input terminals 10a and 10b to the intermediate frequency amplifier 7 through the intermediate frequency tuning circuit 5 and the adjacent channel trap circuit 6, and it is amplified therein.

The switch control circuit 9 has two switch transistors 9a and 9b, of which the collectors are connected to the power supply terminal 10c through each of the feeding resistors 9c and 9d. The collector of the switch transistor 9a is connected to the input terminal 10a through a resistor 9e for blocking the high frequency, and the collector of the switch transistor 9b is connected to the input terminal 10b through a resistor 9f for blocking the high frequency. In addition, each emitter is grounded, and each base is applied with a switch signal (voltage) for turning on/off each of the switch transistors 9a and 9b. Thereby, a low or high switch voltage is output to the input terminals 10a and 10b. Therefore, the input terminals 10a and 10b are shared by the input of the intermediate frequency signal and the output of the switch voltage.

The switch voltage output from the input terminal 10a is supplied to the second option circuit 3 through two serially connected resistors 11 and 12. The connection point of the two resistors 11 and 12 is high-frequency-grounded by a capacitive element 13. Similarly, the switch voltage output from the input terminal 10b is supplied to the first option circuit 2 through two serially connected resistors 14 and 15. The connection point of the two resistors 14 and 15 is high-frequency-grounded by a capacitive element 16.

In the above-mentioned construction, upon operating the first option circuit 2 to attenuate the television signal, for example, the switch transistor 9b is turned off and the switch voltage having a high level output from the input terminal 10b is applied to the first option circuit 2. Similarly, upon operating the second option circuit 3 to attenuate the FM broadcasting band, for example, the switch transistor 9a is turned off and the switch voltage having a high level output from the input terminal 10a is applied to the second option circuit 3. When each of the option circuits 2 and 3 is not operated, the switch transistors 9a and 9b are turned on.

Further, the resistors 11 and 14 for supplying the switch voltage are serially high-frequency-connected and are inserted between the two input terminals 10a and 10b, thereby accomplishing the effect that Q of the intermediate frequency tuning circuit 5 is damped. Accordingly, it is unnecessary that a damping resistor exclusively used in the intermediate frequency tuning circuit 5 be provided.

In addition, although the balanced circuit is used in the mixer 4, the intermediate frequency tuning circuit 5, and the intermediate frequency amplifier 7, the balanced circuit is not necessarily used, and a non-balanced circuit also can accomplish the above-mentioned effect.

What is claimed is:

1. A television tuner, comprising:
a mixer for converting a received television signal into an intermediate frequency signal and outputting the intermediate frequency signal;
an intermediate frequency tuning circuit for tuning the intermediate frequency signal;
an intermediate frequency amplifier provided in an integrated circuit and connected to the intermediate frequency tuning circuit; and
option circuits provided at the side of a front stage of the mixer for being switched into an operational state or non-operational state at a specific receiving band or channel,
wherein the integrated circuit is provided with input terminals for inputting the intermediate frequency signal output from the intermediate frequency tuning circuit to the intermediate frequency amplifier and a switch control circuit for switching operation of the option circuits, where a switch voltage output from the switch control circuit is supplied to the option circuits through the input terminals.

2. The television tuner according to claim 1, wherein the intermediate frequency amplifier is AC-connected to the input terminals, the switch control circuit has switch transistors of which emitter are grounded and collectors are pulled up to a power supply by feeding resistors, and the collectors of the switch transistors are connected to the input terminals through resistors for blocking high frequency.

3. The television tuner according to claim 1, wherein the switch voltage is supplied to the option circuits through resistors of which one end is connected to the input terminal and another end is high-frequency-grounded.

* * * * *

UNITED STATES PATENT AND TRADEMARK OFFICE
CERTIFICATE OF CORRECTION

PATENT NO. : 7,224,408 B2  Page 1 of 1
APPLICATION NO. : 10/924231
DATED : May 29, 2007
INVENTOR(S) : Masaki Yamamoto It is certified that error appears in the above-identified patent and that said Letters Patent is hereby corrected as shown below:

On the Title Page

In column 1, line 1, under "Foreign Application Priority Data", delete "2003-270728" and substitute --UM2003-270728-- in its place.

Signed and Sealed this

Thirteenth Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,224,408 B2 Page 1 of 1
APPLICATION NO. : 10/924231
DATED : May 29, 2007
INVENTOR(S) : Masaki Yamamoto It is certified that error appears in the above-identified patent and that said Letters Patent is hereby corrected as shown below:

On the Title Page

In column 1, line 1, under "Foreign Application Priority Data", delete "2003-270728" and substitute --UM2003-270728-- in its place.

Signed and Sealed this

Twenty-seventh Day of November, 2007

JON W. DUDAS
*Director of the United States Patent and Trademark Office*